United States Patent
Shinohara

[11] Patent Number: 6,004,210
[45] Date of Patent: *Dec. 21, 1999

[54] VIDEO GAME SYSTEM AND GAME CONTROLLER

[75] Inventor: Satoshi Shinohara, Tokyo, Japan

[73] Assignee: Sony Computer Entertainment, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/703,869

[22] Filed: Aug. 27, 1996

[30] Foreign Application Priority Data

Aug. 30, 1995 [JP] Japan ................................ 7-246617

[51] Int. Cl.[6] .................................................. A63F 9/00
[52] U.S. Cl. ................................................ 463/36
[58] Field of Search ...................... 463/36, 37, 38, 463/39; 345/156, 157, 158, 159, 160, 161, 162, 163, 168

[56] References Cited

U.S. PATENT DOCUMENTS

| | | |
|---|---|---|
| 4,552,360 | 11/1985 | Bromlet et al. ............................ 463/38 |
| 4,824,111 | 4/1989 | Hoye et al. . |
| 5,207,426 | 5/1993 | Inoue et al. ............................... 463/36 |
| 5,225,831 | 7/1993 | Osborn ...................................... 463/38 |
| 5,396,267 | 3/1995 | Bouton . |

OTHER PUBLICATIONS

IBM Technical Disclosure Bulletin, "Analog Joystick Interface Emulation Using A Digital Counter", vol. 37, No. 8, Aug. 1994, pp. 73–74, XP000456166.

Primary Examiner—George Manuel
Attorney, Agent, or Firm—Hill & Simpson

[57] ABSTRACT

In a video game system and a game controller, discrepancy ween the manipulation of the user and the display position on screen, etc., can be prevented, without adding adjusting ponents after forwarding them from the factory. The digitized log manipulation information which have been obtained from the ipulation information generating means are calibrated by the ipulation information calibrating means provided in the game troller, and then the digitized and calibrated analog ipulation information which have been obtained by calibration transmitted to the game processing device.

14 Claims, 2 Drawing Sheets

VIDEO GAME SYSTEM AND GAME CONTROLLER

BACKGROUND OF THE INVENTION

1. Field of the Invention

This invention relates to a video game system and game controller, and more particularly, is applicable to that which performs analog control of a display position on a screen, etc., with a game controller.

2. Description of the Related Art

Heretofore, video game systems employed analog control of a display position on the screen, etc., with a game controller, and as the game proceeds, displaying the game contents which have been stored in a video recording medium, such as a CD-ROM, on the screen of a television receiver.

The game controller of this video game system is provided with a manipulator which is operated by the user, such as a joy stick, and converts the manipulated variable of the joy stick from an analog value into a digital value, and then sends it to the game machine main frame.

When this analog value is obtained, in the game controller, the analog signal which is output from the analog switch is controlled in accordance with the manipulated variable of the joy stick. The game controller converts this analog signal with an analog-to-digital converter (hereinafter, referred to as an A/D converter) to obtain the analog value, and then directly sends out the manipulated variable of the joy stick represented with this digital value to the game machine main frame.

By the way, when a video game machine is forwarded from the factory, a deviation of adjustment of the analog switch may possibly occur. Besides, age deterioration occurs in the mechanical part of the joy stick and the analog switch. For this reason, even though the manipulated variable of the joy stick is constant, the analog value may possibly drift from the original value.

Accordingly, there has been such a problem that the display position on the screen, etc., may possibly deviate from the manipulation of the user, after it has been forwarded from the factory. In addition, there has been such a problem that, when the deviation or the analog value has drifted from the original value, means for compensating it do not exist, or it is necessary to add some adjusting components.

SUMMARY OF THE INVENTION

In view of the foregoing, an object of this invention is to provide a video game system and game controller in which the occurrence of a discrepancy between the manipulation of the user and the display position on the screen, etc., can be corrected without the addition of adjusting components after forwarding them from the factory.

The foregoing object and other objects of the invention have been achieved by the provision of a video game system, which has a game processing device for processing the contents of a game and a game controller for manipulating the state of the processing, for processing a game based on manipulation of the game controller. In the video game system, a manipulation information generating means of the game controller outputs digitized manipulation information, in accordance with an analog input manipulation which is given from the exterior. Manipulation information calibrating means of the game controller operate on the analog manipulation information, so as to produce digitized calibrated analog manipulation information which is a calibrated form of the analog manipulation information.

The digitized analog manipulation information which have been obtained from the manipulation information generating means are calibrated by the manipulation information calibrating means provided in the game controller, and the digitized and calibrated analog manipulation information which have been obtained by calibration is transmitted to the game processing device, so that discrepancy between the manipulation of the user and the display position on the screen, etc. can be easily prevented, without adding adjusting components after forwarding it from the factory.

Besides, in the present invention, in the game controller which manipulates the processing state of the game processing device for processing the game contents and progresses the game, the manipulation information generating means outputs the digitized analog manipulation information, in accordance with the analog input manipulation from the exterior. The manipulation information calibrating means operate on the analog manipulation information, and produce the digitized calibrated analog manipulation information which is the calibrated one of the analog manipulation information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
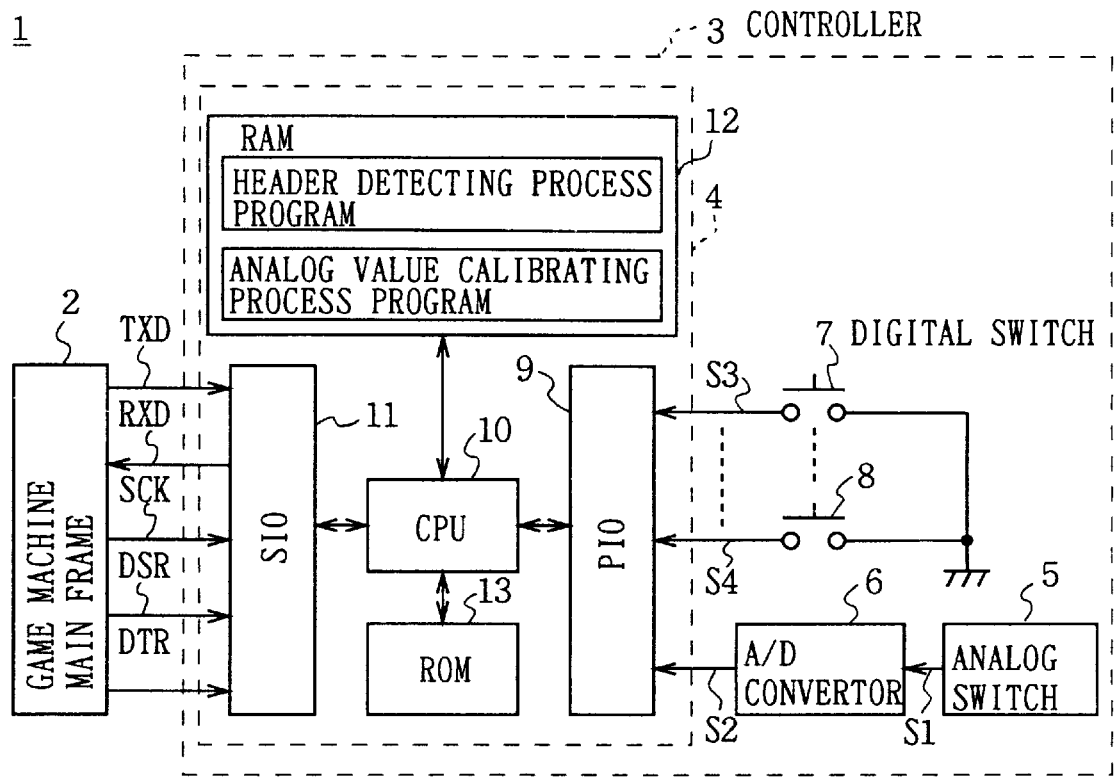
FIG. 1 is a block diagram illustrating a video game system and a game controller of one embodiment according to the present invention.

A preferred embodiment of this invention will be described with reference to the accompanying drawings:

FIG. 1 shows a video game system 1 as a whole, in which a game controller, for instance, a controller 3 is connected to a game processing device, for instance, a game machine main frame 2, and the data are bidirectionally transmitted with the stated communication procedure.

The game machine main frame 2 has a built-in CD-ROM drive (not shown) for reproducing a CD-ROM and a built-in microcomputer (not shown) for processing the reproduced game contents, and it displays the game contents on the screen of a television receiver and progresses the game. Besides, the game machine main frame 2 controls the display position on the screen, etc., on the basis of information of digital and analog manipulation by the controller 3.

The controller 3 has been provided with manipulation information calibrating means, for instance, a one chip microcomputer 4 for generally controlling, manipulation information generating means, for instance, a manipulation-inputting analog switch 5, an A/D converter 6, and a plurality of digital switches 7 and 8 for inputting manipulation.

In this connection, the analog signal S1 which is output from the analog switch 5 is controlled in accordance with the manipulated variable at the joy stick.

The one chip microcomputer 4 includes a parallel I/O interface port (shown by PIO, in the figure) 9, a micro processor (shown by CPU, in the figure) 10, a serial I/O interface port (shown by SIO, in the figure) 11, a RAM 12, and a ROM 13.

The controller 3 gives the analog signal S1 which has been output by the analog switch 5 to the A/D converter 6 so as to convert it into digitized analog manipulation information, for instance, switch data S2. The controller 3 reads the switch data S2 in the micro processor 10 along with switch data S3 and S4 by the digital switches 7 and 8, via the parallel I/O interface port 9.

The controller 3 delivers the switch data which have been obtained through the operation by the micro processor 10 to the game machine main frame 2 as a receive data packet, via the serial I/O interface port 11.

Thereby, the controller 3 is able to give the game machine main frame 2 one analog value and plural digital values which are based on the user manipulation.

The controller 3 performs serial communication of the transmit data packet which has been issued from the game machine main frame 2, via the serial I/O interface port 11. The controller 3 detects the header part of the transmit data packet, employing a header-detection processing program which has been stored in the RAM 12.

Upon receiving the transmit data packet which has been directed to itself, the controller 3 examines the data of the data part, by means of the micro processor 10. When the instruction of calibrating the analog value is obtained, the controller 3 converts the switch data S2 into the standard value so as to calibrate it, employing an analog value calibration processing program which has been stored in the RAM 12.

Figure 2A:
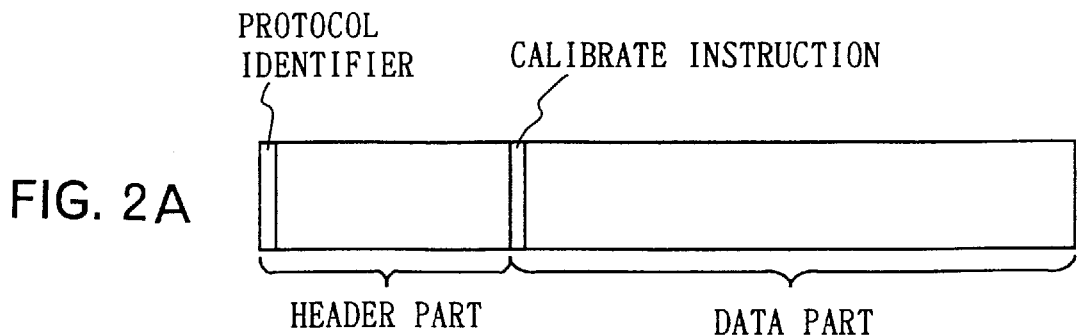
FIGS. 2A and 2B are schematic diagrams showing a constitution of a transmit data packet and a receive data packet.
Figure 2B:
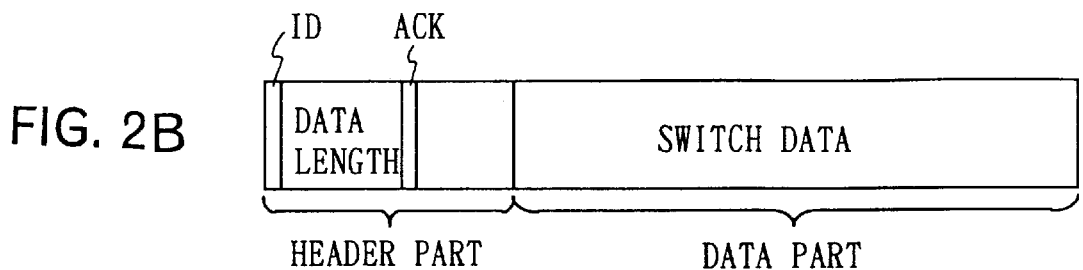

As shown in FIGS. 2A and 2B, in the header part of the transmit data packet, a protocol identifier which indicates that it is a packet for the controller 3 has been entered. On the other hand, in the data part of the transmit data packet, instructions toward the controller 3, etc. have been entered. The instruction can cause the controller 3 to calibrate the analog value.

In the header part of the receive data packet, an identification number (shown by ID, in the figure) of the controller 3, a data length, and a data response acknowledgment (shown by ACK, in the figure) have been entered.

In the data part of the receive data packet, the current calibrated analog manipulation information, for instance, the switch data which have been calibrated by the controller 3 have been entered.

In this connection, the game machine main frame 2 and the controller 3 are connected with a data transmission signal line TXD for delivering the transmit data from the game machine main frame 2 to the controller 3, and a data transmission signal line RXD for delivering the receive data from the controller 3 to the game machine main frame 2.

In addition, the game machine main frame 2 and the controller 3 are connected with a serial synchronous clock signal line SCK for extracting the data from the data transmission signal lines TXD and RXD, a control line DTR for establishing and breaking communication, and a flow controlling control line DSR for transferring mass data.

Figure 3:
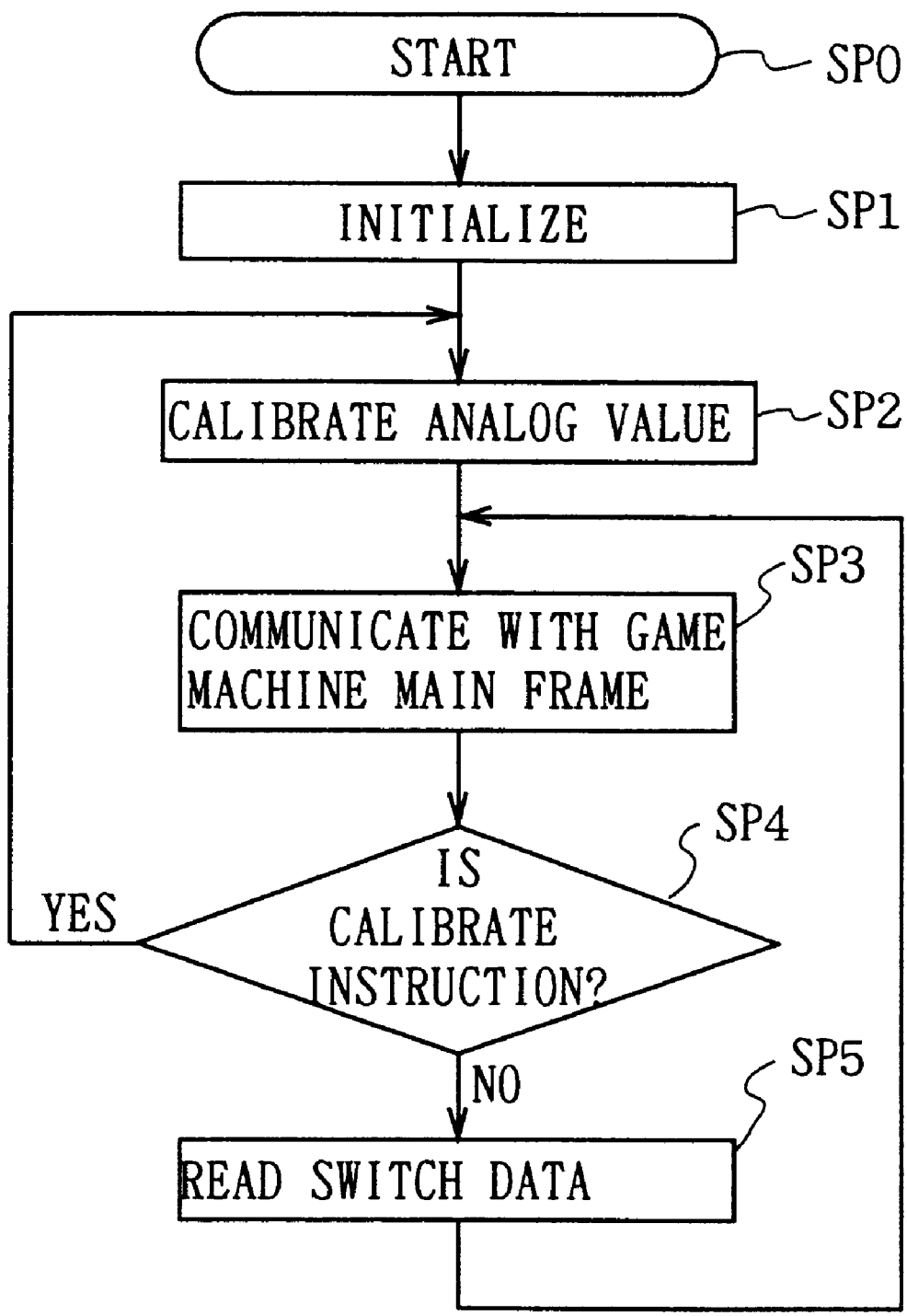
FIG. 3 is a flow chart showing the operating order of the controller.

In the above construction, the video game machine 1 operates in accordance with the operative procedure shown in FIG. 3. That is, when the user turns on the power supply or performs reset operation, the video game system 1 enters from the start step SPO, and then proceeds to step SP1. At step SP1, the video game system 1 performs initializing, by setting of the communication function, preparing of the buffer area within the RAM 12, setting of the signaling speed of the serial I/O interface port 11, etc., and then proceeds to step SP2.

At the step SP2, the video game system 1 reads the analog value which is represented by the current switch data S2 wherein the joy stick is in the neutral state, and sets this value as the standard value. Thereafter, analog manipulation information which have been converted on the basis of this value are determined as calibrated analog manipulation information which are given to the game machine main frame.

For instance, if the range of the manipulated variable which are given to the game system main frame 2 by the video game system 1 is "0 to 255" in analog values, and the value of the switch data S2 which is converted into analog values is "120", then the analog value "120" is converted into the central analog value "128". The other analog values which are represented with the switch data S2 are similarly processed.

Next, at step SP3, the video game system 1 transfers a transmit data packet containing an instruction from the game machine main frame 2 to the controller 3. Besides, the video game system 1 transfers a receive data packet containing switch data from the controller 3 to the game machine main frame 2, and then proceeds to step SP4.

At step SP4, the video game system 1 examines the data part of the transmit data packet which has been delivered from the game machine main frame 2, and judges whether there is the instruction of calibration of the analog value or not. At step SP4, if a negative result is obtained, then the video game system 1 decides that there should not be the instruction of calibrating the analog value which is due to the analog switch 5, and proceeds to step SP5.

At the step SP5, the video game system 1 reads plural digital values which are due to the digital switches 7 and 8, and an analog value which is due to the analog switch 5. The video game system 1 charges the receive packet data with the read switch data, and then returns to the step SP3 so as to repeat the aforementioned procedure.

If an affirmative result is obtained at the step SP4, the video game system 1 decides that it has received the instruction of calibrating the analog value which is due to the analog switch 5, and returns to step SP2 so as to repeat the aforementioned procedure.

In this way, each time the power source is turned on or resetting operation is performed, the instruction of calibrating the analog value is given to the controller 3, so that the analog value which is due to the analog switch 5 is calibrated. As a result, even though the analog signal S1 which is output by the analog switch 5 has drifted due to aged deterioration, etc., correct analog value can be transmitted to the game machine main frame 2. Therefore, the display position on the screen, etc. are always matched with the manipulation of the user.

According to the above construction, the digitized analog value which has been obtained on the basis of the analog signal S1 which has been outputted by the analog switch 5 is calibrated and then the calibrated analog value is transmitted to the game machine main frame 2, by the one chip microcomputer 4 which is included in the controller 3, so that discrepancy between the manipulation of the user and the display position on the screen, etc. can be easily prevented without adding adjusting components after forwarding from the factory.

While in the aforesaid embodiment, the analog controller 2 calibrates the analog value which is owing to the analog switch 5 when the instruction of calibrating the analog value has been given from the game machine main frame 2, however, the present invention is not limited thereto and the controller 3 itself can calibrates the analog value which is owing to the analog switch 5, at the time of, for instance, each turning on of the power source. In this case, the same effects as the above can be also obtained.

While in the aforesaid embodiment, the present invention is applied to the controller 3 which is connected to the game machine main frame 2 which is a build-in CD-ROM drive (not shown) for reproducing a CD-ROM, however, the present invention is not limited thereto and a video game system and a game controller in which a game is progressed on the basis of reception of the game contents data can be applied, instead of reproducing the game contents from a CD-ROM.

Further, while in the aforesaid embodiment, the game machine main frame 2 and the controller 3 are connected by the data transmission signal lines TXD, RXD and SCK, and the control lines DTR and DSR, however, the present invention is not limited thereto and the game machine main frame 2 and the controller 3 are not connected by signal lines but they can communicate the analog manipulation information, etc. to each other by the use of infrared rays, ultrasonic waves, electronic radio waves, etc.

Furthermore, while in the aforesaid embodiment, the digitized analog value is obtained by the use of the manipulation inputting analog switch 5 and the A/D converter 6, however, the present invention is not limited thereto and the digitized analog manipulation information can be obtained, by arbitrary construction and method, on the basis of analog inputting manipulation by the user.

As described above, according to the present invention, the digitized analog manipulation information which have been obtained from the manipulation information generating means are calibrated by the manipulation information calibrating means provided in the game controller, and then the digitized and calibrated analog manipulation information which have been obtained by calibrating are transmitted to the game processing device; therefore, it is able to realize a video game system and a game controller wherein discrepancy between the manipulation of the user and the display position on the screen, etc. can be easily prevented without adding adjusting components after forwarding them from the factory.

While there has been described in conjunction with the preferred embodiments of the invention, it will be obvious tot hose skilled in the art that various changes and modifications may be aimed, therefore, to cover in the appended claimed all such changes and modifications as fall within the true spirit and scope of the invention.

While is claimed is:

1. A video game system comprising:
   game processing means for processing game instructions;
   a game controller;
   said game controller comprising:
   means for outputting digitized analog manipulation information, proportional to an analog manipulation in. comprising an analog switch for outputting an analog signal which is proportional to said analog manipulation input, and an analog-to-digital converter which provides digitized analog manipulation information;
   manipulation information calibrating means for operating on said digitized analog manipulation information, thereby producing digitized calibrated analog manipulation information which is a calibrated form of the analog manipulation information; and
   means for outputting the calibrating analog manipulation information to a game device.

2. The video game system according to claim 1, wherein said game processing means further comprises means for reproducing instructions from a video recording medium on which said instructions have been recorded.

3. The video game system according to claim 1, wherein said game processing means processes said game instructions which have been externally provided.

4. The video game system according to claim 1, wherein said game controller causes calibration of said analog manipulation information by said manipulation information calibrating means in response to a calibration instruction.

5. The video game system according to claim 1 or 4, wherein said game controller calibrates said analog manipulation information by said manipulation information calibrating means, when a power supply is turned on.

6. A game controller, comprising:
   means for outputting digitized analog manipulation information, proportional to an analog manipulation input;
   calibrating means for operating on said digitized analog manipulation information, thereby producing the digitized calibrated analog manipulation information which is a calibrated form of the analog manipulation information; and
   output means for outputting said calibrated analog manipulation information.

7. The game controller according to claim 6, wherein said analog manipulation information is calibrated by said manipulation information calibrating means in response to a calibration instruction.

8. The game controller according to claim 6 or 7, wherein said analog manipulation information is calibrated by said manipulation information calibrating means, when a power supply is turned on.

9. The game controller according to claim 6, wherein:
   means for outputting digitized analog manipulation information comprising an analog switch for outputting an analog signal which is proportional to said analog input manipulation, and an analog-to-digital converter which provides digitized analog manipulation information.

10. The game controller according to claim 7, wherein said calibrating means comprises:
    storing means for storing control information for calibrating said analog manipulation information; and
    processing means for operating on said control information according to a calibration instruction.

11. The game controller according to claim 7, wherein said output means comprises a serial interface for transmitting said calibrated analog manipulation information as serial data.

12. The game controller according to claim 11, wherein said output means comprises means for packetizing said calibrated analog manipulating information.

13. The game controller according to claim 6, wherein said means for outputting digitized, analog manipulation information comprises an interface to which said digitize analog manipulation information obtained from digital manipulation information and analog manipulation input is supplied.

14. A method of calibrating an electronic game comprising the steps of:

generating an analog signal representative of an analog position of a game controller by manipulating an analog switch to produce a manipulation input and outputting an analog signal from said analog switch which is proportional to said manipulation input;

converting the analog signal to a first digital signal; and correlating the first digital signal with a known position of the game controller to provide a second digital signal which is a calibrated signal representing an actual position of the game controller.

\* \* \* \* \*